United States Patent [19]

Siwiak

[11] Patent Number: 4,578,628

[45] Date of Patent: Mar. 25, 1986

[54] PORTABLE BATTERY POWERED ELECTRICAL APPARATUS WITH IMPROVED BATTERY PACK PROTECTED AGAINST INADVERTENT SHORT CIRCUIT OF THE BATTERY TERMINALS

[75] Inventor: Kazimierz Siwiak, Sunrise, Fla.

[73] Assignee: Motorola Inc., Schaumburg, Ill.

[21] Appl. No.: 688,950

[22] Filed: Jan. 4, 1985

[51] Int. Cl.⁴ .................. H02J 7/00; H01M 2/10; H04B 1/38

[52] U.S. Cl. ................. 320/2; 429/97; 455/89; 455/349

[58] Field of Search ................. 320/2–4, 320/15; 429/1, 9, 10, 97–100; 455/89, 90, 349

[56] References Cited

U.S. PATENT DOCUMENTS

| | | | |
|---|---|---|---|
| 3,533,119 | 10/1970 | Dokos | 320/2 X |
| 3,728,664 | 4/1973 | Hurst | 320/2 X |
| 3,855,534 | 12/1974 | Holcomb | 455/349 |
| 3,864,172 | 2/1975 | Marks | 429/1 |
| 3,864,173 | 2/1975 | Butschkau | 429/10 |
| 4,072,800 | 2/1978 | Bock | 429/97 |
| 4,191,917 | 3/1980 | Brown et al. | 320/2 |
| 4,436,792 | 3/1984 | Tomino et al. | 429/1 |

FOREIGN PATENT DOCUMENTS 0018940 11/1980 European Pat. Off. ........... 455/90

Primary Examiner—R. J. Hickey
Attorney, Agent, or Firm—James W. Gillman; Donald B. Southard; Joseph T. Downey

[57] ABSTRACT

An improved portable battery powered electrical device is disclosed which includes a battery pack having normally inactivated battery terminals so that inadvertent short circuiting thereof will not produce an undesirable high amplitude short current thereacross. A normally open switch interrupts the current path in the battery pack which is actuated to energize such battery terminals only when the battery pack is fully interconnected and mated to the associated portable housing. Fuse means are included to prevent the use of unauthorized battery packs without the foregoing safeguard provisions.

6 Claims, 4 Drawing Figures

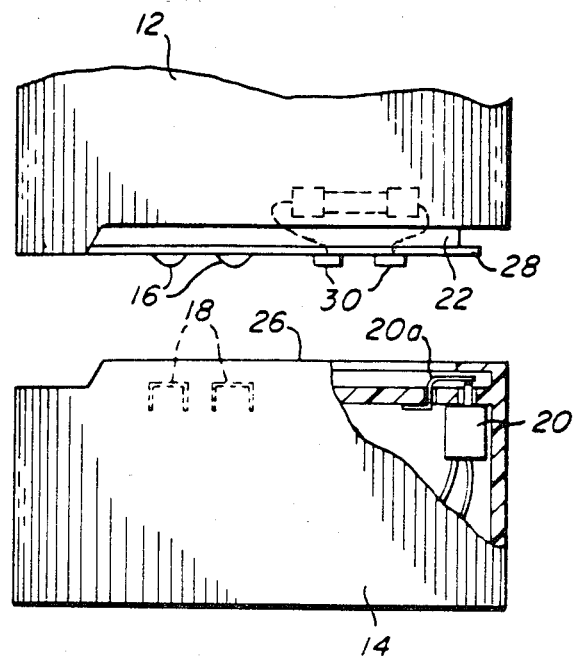
_Fig.3_
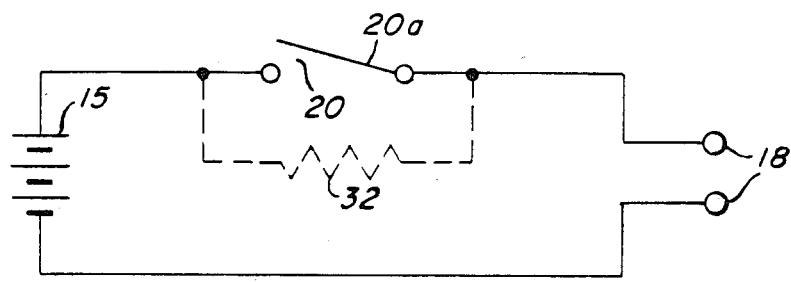
_Fig.4_

PORTABLE BATTERY POWERED ELECTRICAL APPARATUS WITH IMPROVED BATTERY PACK PROTECTED AGAINST INADVERTENT SHORT CIRCUIT OF THE BATTERY TERMINALS

BACKGROUND OF THE INVENTION

The present invention relates in general to battery packs for energizing electrical or electronic equipment and more particularly to an improved battery pack for such equipment which greatly reduces the probability of inadvertently short circuiting the included battery terminals and the deleterious effects resulting therefrom.

Battery packs intended for attachment to and for energizing of electrical or electronic equipment, e.g., two-way portable radio transceivers, necessarily must have battery terminals which are intended to mate with corresponding supply terminals on the equipment itself for supplying power thereto for operating such equipment. These contacts or terminals are exposed when the battery pack is separated from the equipment portion which it powers. Inadvertent short circuiting such terminals can have serious risks to the user, from burns due to the metal causing the short circuit heating up to high temperatures, to more serious injury resulting from battery packs exploding which may occur when using the nickel cadmium battery types.

There have been some attempts in the past to address this problem. One such prior solution was to provide a magnetically actuated switch arrangement wherein a normally open switch, i.e., reed switch, is included in the battery compartment and an actuating magnet positioned in the electronic apparatus such that the reed switch is actuated to render the battery terminals live when the battery pack is fully mated to its associated electrical or electronic apparatus. However, this protects the user only in those situations where the battery pack in fact includes the actuatable reed switch. It does not protect the user from accidental short circuiting the battery terminals in a battery pack without such reed switch. The battery terminals in that case are simply alive at all times.

What is needed then, is a combination electrical apparatus and battery pack arrangement which is safe to operate under any conditions, and which prevents the use of a conventional battery pack in substitution thereof without the safeguard provisions previously specified.

SUMMARY OF THE INVENTION

Accordingly, it is an object of the present invention to provide an improved combination of electrical/electronic apparatus and battery pack arrangement which is safe to operate under any and all operating conditions.

Another object of the present invention is to provide a battery pack arrangement for an associated electrical/electronic apparatus which includes battery terminals which are not activated, i.e., live, until and unless such associated apparatus is fully attached and locked into proper position on the battery pack.

Still another object of the present invention is to provide a convenient means of preventing the use of a manufacturer unauthorized battery pack with the associated electrical/electronic apparatus which does not have the foregoing safeguard protection.

In practicing the invention, an approved portable battery powered electrical apparatus which includes a first housing portion for accomodating therein the electrical circuitry and associated components which supply operating power through a first set of supply terminals. A second housing portion is likewise provided which includes a battery power source therein which is connected to a normally inactivated or current interrupted second set of battery terminals. The second housing portion also includes a switch for activating or energizing such battery terminals. The two housing portions are intended to be detachably interconnected such that the referenced switch is actuated to activate the battery terminals only when full interconnection thereof is accomplished.

Provision is made to prevent the use of a manufacturer unauthorized battery power source if such includes battery terminals therein that may be activated at any time prior to mating with the first housing portion. In one embodiment, this provision includes positioning a second set of terminals in the first housing portion to which a fuse device is operatively connected. The battery terminals are designed to contact the fuse terminals prior to contacting the supply terminals. If the battery terminals are alive and activated before fully mating with the first housing portion, such fuse device will blow thereby preventing the use of such manufacturer unauthorized battery power source.

BRIEF DESCRIPTION OF THE DRAWINGS

The features of the present invention which are believed to be novel are set forth with particularity in the appended claims. The invention, itself, together with further objects and advantages thereof, may be best understood by reference to the following description when taken in conjunction with the accompanying drawing, in which:

FIG. 3 is a fragmentary view in side elevation of the radio housing portions of FIGS. 1 and 2; and FIG. 4 is a schematic representation of the battery power source, switch and battery terminal together with a current limiting resistance.

DESCRIPTION OF THE PREFERRED EMBODIMENT

Figure 1:
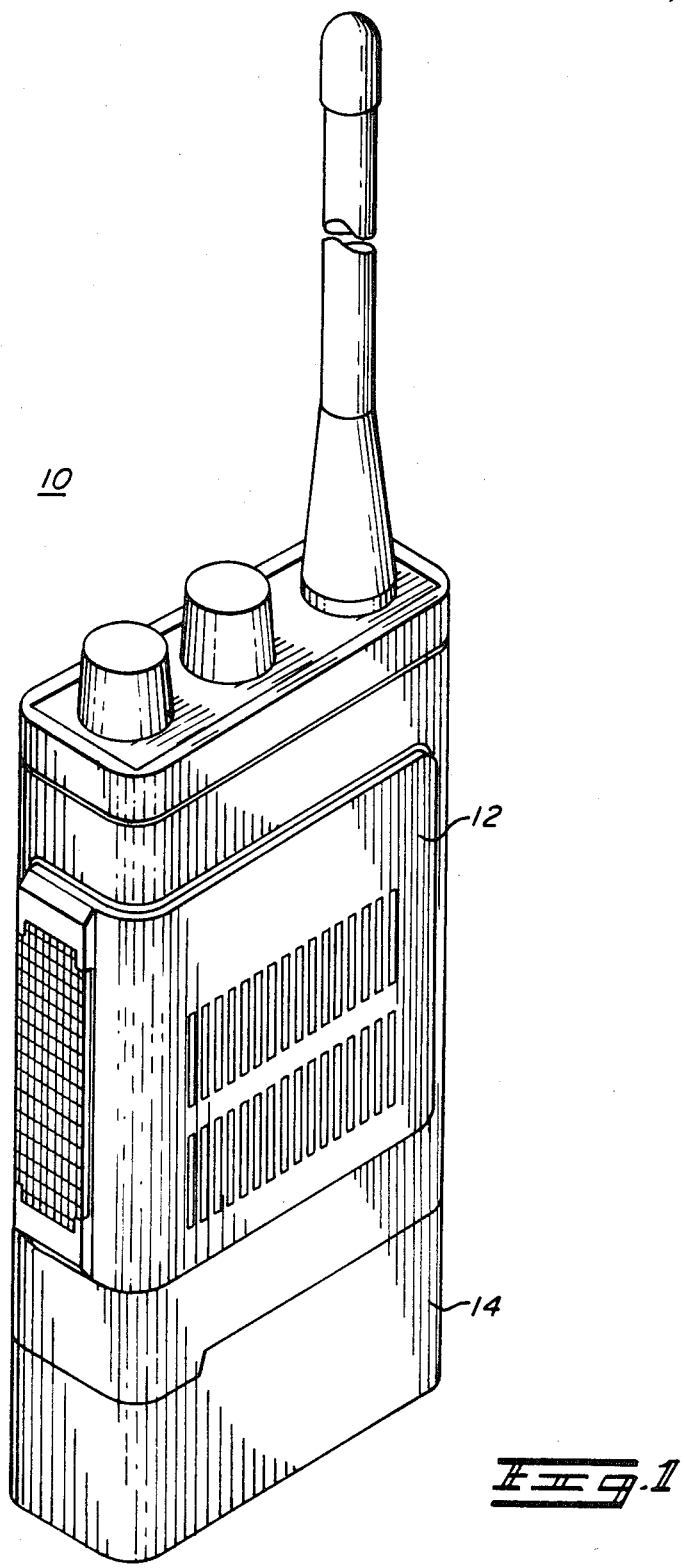
FIG. 1 is a view in perspective of a typical hand held portable device powered by a battery source, which device includes one embodiment of the present invention.
Figure 2:
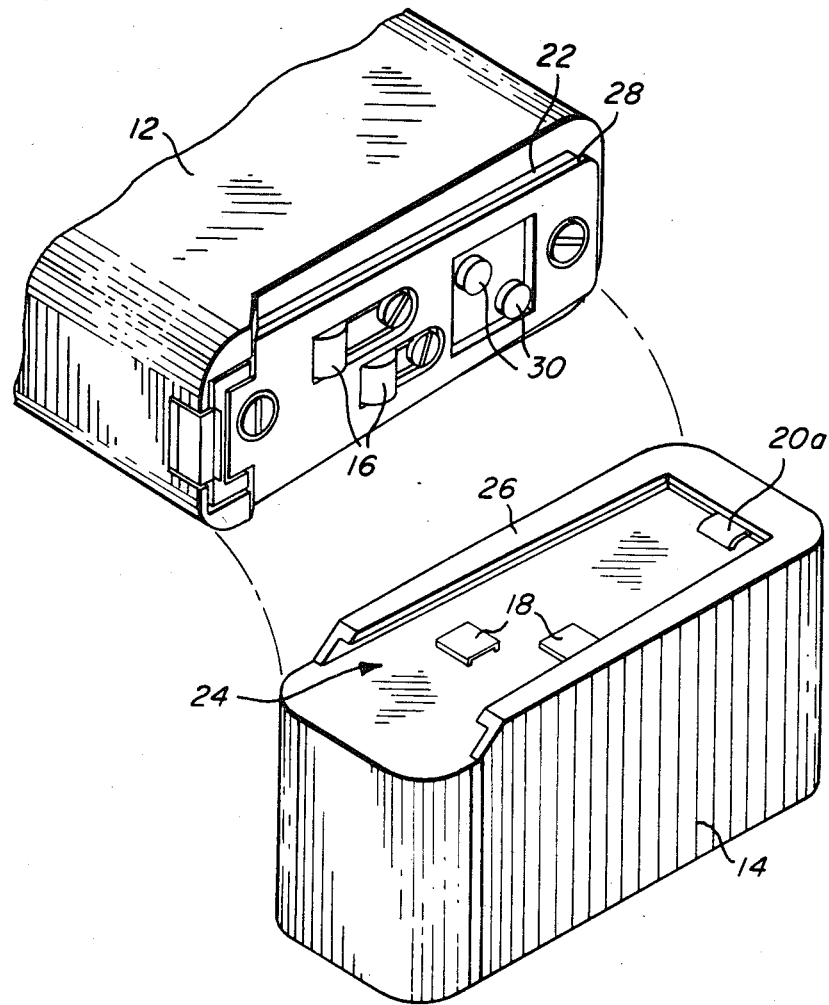
FIG. 2 is a fragmentary view in perspective of the radio apparatus of FIG. 1 showing the interconnection components between the respective housing portions.

Referring now to the drawings, a typical battery powered portable device is provided, in this case, a two-way portable radio transceiver 10, which device has been constructed in accordance with one embodiment of the present invention. The radio 10 includes all of the necessary controls, such as push-to-talk switch, volume control, squelch control and the like, not specifically numerically designated, but well understood by those skilled in the art. Radio 10 further includes a first radio housing portion 12 which contains all of the operating electrical/electronic circuitry and associated components therefor (not shown). Such circuitry is energized by a suitable power source when interconnected to a pair of supply terminals, as referenced at 16 (see FIG. 2).

A second housing portion 14 is provided which includes a battery power source 15. As best seen in FIG.

4, battery source 15 connects to respective terminals 18 through an intermediate switch device 20. Switch 20 is normally open, i.e., unactuated, which in turn renders battery terminals 18 normally inactivated. Accordingly, with housing portion 14 unconnected to housing portion 12, terminals 18 remain unenergized and even though the terminals 18 may be short circuited, the battery source 15 cannot by reason of the current path being interrupted. Switch 20 remains unactuated as long as housing portions 12 and 14 remain unconnected and unmated.

To activate the terminals 18, the housing portions 12 and 14 must be interconnected. To accomplish this (best seen in FIGS. 2 and 3), the forward section 22 on the bottom portion of housing 12, and which is of a reduced configuration, is slipped into the opening 24 formed in the rear of the inturned ledge 26 positioned on the top of housing portion 14. As housing portion 12 is pushed forward, flange 28 on the bottom of the forward section 22 is effectively captivated under the underside of ledge 26. As section 22 slides still further forward, the front end thereof contacts activating lever 20a of switch 20. Battery terminals 18 thus become activated. When fully seated, terminal 18 mates with supply terminal 16 and operating power is thereby supplied to the radio circuitry in housing portion 12.

It will also be observed that a third set of terminals 30 are placed forward of supply terminals 16 on the undersurface of housing portion 12. As housing portion 12 is pushed forward, battery terminals 18 first slide across terminals 30 before they mate with supply terminal 16. A fuse device (not specifically shown) is operatively connected across fuse terminals 30. Accordingly, if battery terminals 18 are alive, i.e., energized, when they meet fuse terminals 30, such fuse device will of course be blown. In this manner, such manufacturer unauthorized battery power sources are effectively prevented from being used with the radio 10.

Accordingly, it will be appreciated that inadvertent short circuiting of battery terminals 18 while the battery pack, in this instance housing portion 14, is disconnected from the associated housing portion 12 will have no deleterious effects because the terminals 18 remain unenergized in this circumstance. Switch 20 must be actuated to render battery terminals 18 live. Further, switch 20 is preferably located in a position under the forward end of ledge 26 so that it can only be contacted by the front edge of section 22. The switch 20 remains largely inaccessible for actuation by any other means, and thus protected from accidental contact.

It will also be noted that FIG. 4 includes a resistance 32 in parallel with switch 20. This resistance can be considered as optional but when present is intended as a convenient way of testing or otherwise measuring the voltage at battery terminals 18 when switch 20 is in the unactuated mode. Resistance 32, however, is made sufficiently high so that adequate current limiting capability is effected. That is, it will insure limiting short circuit current to an extremely low value and in this way the intrinsic safety features of the battery is not impacted or otherwise defeated.

What is claimed is:

1. An improved portable battery operated electrical apparatus, including in combination:
 a first housing portion having electrically energized circuitry and components therein supplied operating power through a first set of included supply terminals;
 a second housing portion having a battery power source and a second set of normally inactivated battery terminals and switch means for selectively activating said second set of battery terminals;
 said first and second housing portions having means for detachably interconnecting the same whereby said second set of battery terminals connected to said battery power source are activated by said switch means only upon interconnection of said housing portions; and
 means for preventing the use of battery power sources having battery terminals activated prior to mating with said first housing portion.

2. In a portable battery powered electrical apparatus having a first housing portion for accommodating electrically energized circuitry and components therein through a first set of included supply terminals, said first housing portion further including a second set of fuse terminals connected to an included fuse device, the improvement comprising:
 a second housing portion having a battery power source and a third set of normally inactivated battery terminals and switch means for selectively actuating said last named terminals; and
 means for detachably interconnecting said second housing portion to said first portion and actuating said switch means to activate said third set of battery terminals only upon said interconnection being fully effected,
 said third set of battery terminals first contacting said second set of fuse terminals to which said fuse device is connected prior to contacting said first set of supply terminals.

3. The improved portable battery operated electrical apparatus in accordance with claim 1 wherein said means for preventing the use of battery power sources having battery terminals activated prior to mating with said first housing portion includes a fuse device.

4. The improved portable battery operated electrical apparatus in accordance with claim 3 wherein said fuse device is connected across a third set of fuse terminals on the underside of said first housing portion.

5. The improved portable battery operated electrical apparatus in accordance with claim 4 wherein said third set of fuse terminals are positioned to be contacted by said battery terminals on said second housing portion prior to said latter contacting said supply terminals.

6. The improved portable battery operated electrical apparatus in accordance with claim 1 wherein an added high resistance is connected across said switch so as to permit testing of battery source voltage at said battery terminals while limiting short circuit current to a safe value.

* * * * *